(12) United States Patent
Bone

(10) Patent No.: US 9,699,156 B2
(45) Date of Patent: Jul. 4, 2017

(54) SECURE ASSOCIATION

(75) Inventor: Nicholas Bone, Thatcham (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 287 days.

(21) Appl. No.: 13/823,583

(22) PCT Filed: Sep. 14, 2011

(86) PCT No.: PCT/GB2011/051724
§ 371 (c)(1),
(2), (4) Date: Jul. 31, 2013

(87) PCT Pub. No.: WO2012/035340
PCT Pub. Date: Mar. 22, 2012

(65) Prior Publication Data
US 2014/0150063 A1    May 29, 2014

(30) Foreign Application Priority Data

Sep. 14, 2010  (GB) .................................. 1015324.5

(51) Int. Cl.
G06F 7/04       (2006.01)
H04L 29/06      (2006.01)
H04W 12/06      (2009.01)

(52) U.S. Cl.
CPC .............. H04L 63/08 (2013.01); H04L 63/18 (2013.01); H04L 63/20 (2013.01); H04W 12/06 (2013.01)

(58) Field of Classification Search
CPC .............. H04L 63/0869; H04L 63/205; H04L 63/0281; H04L 63/061; H04L 9/0861;
(Continued)

(56) References Cited

U.S. PATENT DOCUMENTS 6,990,511 B2 * 1/2006 Ferwerda ................ G06F 9/465
                                                    709/201
8,990,554 B2 * 3/2015 King .................... H04L 63/062
                                                    713/155

(Continued)

FOREIGN PATENT DOCUMENTS

WO      WO 00/08818       2/2000
WO      WO 2008/044581    4/2008
WO      PCT/GB2011/051724 1/2012

Primary Examiner — Farid Homayounmehr
Assistant Examiner — Lizbeth Torres-Diaz
(74) Attorney, Agent, or Firm — Workman Nydegger

(57) ABSTRACT

To enable formation of secure associations between IP-enabled devices when they have not previously connected, a method is proposed where a declaration of ownership of a target device is made by the subscriber of a originating device and that subscriber giving that declaration is authenticated by means of a SIM card, say. The originating device establishes secure connection to a first server. The target device establishes a secure connection to a second server. Provided the first and second servers can establish a conventional IP-type SA (e.g. using IPSec or TLS), there is a chain of secure associations between the two devices. This chain is then used to build a new secure association between originating device and target Device. The first and second servers thus act as proxies for two devices respectively and negotiate the secure association on their behalf. They then transfer the new secure association information securely to the devices using the existing chain of secure associations.

9 Claims, 3 Drawing Sheets

(58) Field of Classification Search
CPC ............... H04L 63/0884; H04L 9/3273; H04L 41/0806; H04L 61/2007; H04W 88/02
USPC ................. 380/279; 713/168–169; 726/3, 12
See application file for complete search history.

(56) References Cited

U.S. PATENT DOCUMENTS

| | | | |
|---|---|---|---|
| 2004/0117657 A1* | 6/2004 | Gabor ................. | H04L 63/0428 726/4 |
| 2007/0289009 A1* | 12/2007 | Phan-Anh ........... | H04L 63/0281 726/12 |
| 2008/0037787 A1* | 2/2008 | Boynton ............. | H04L 12/5895 380/270 |
| 2008/0133761 A1* | 6/2008 | Polk .................... | H04L 63/0428 709/228 |
| 2008/0137863 A1* | 6/2008 | Thomas ................ | H04L 63/068 380/273 |
| 2009/0063851 A1* | 3/2009 | Nijdam ................. | H04L 63/064 713/155 |
| 2010/0153726 A1* | 6/2010 | Liu ......................... | H04L 9/083 713/171 |
| 2010/0162348 A1* | 6/2010 | Narayanan .............. | H04L 67/14 726/1 |
| 2010/0268937 A1* | 10/2010 | Blom .................... | H04L 63/061 713/153 |
| 2011/0185070 A1* | 7/2011 | Xue ................. | H04L 29/12066 709/227 |
| 2011/0206206 A1* | 8/2011 | Blom ..................... | H04L 9/083 380/279 |
| 2013/0091556 A1* | 4/2013 | Horn ....................... | H04W 4/00 726/4 |

\* cited by examiner

SECURE ASSOCIATION

CROSS REFERENCE TO RELATED APPLICATIONS

This application is a U.S. Nationalization of International Application Number PCT/GB2011/051724, filed on Sep. 14, 2011, which claims priority to United Kingdom Patent Application No. 1015324.5, filed on Sep. 14, 2010, the entireties of which are incorporated herein by reference.

FIELD OF THE INVENTION

The invention relates to a method for associating devices securely. In particular, the invention relates to the formation of secure associations between IP-enabled devices when they have not previously connected.

BACKGROUND TO THE INVENTION

There is currently no simple way for low-cost IP-enabled devices to establish peer to peer security associations (SA) (shared keys and algorithms, authenticated device identities, connection info, ports and protocols) when they have not previously connected.

Pre-configuring such devices with shared keys or certificates at manufacture may be considered but this approach does not extrapolate to allow interoperation between other legacy devices or devices that have been preconfigured with different keys/certificates.

In the following discussion, the term "IP-type" SA refers to a security association between two IP-enabled peers. Examples include associations at IPSec level, TLS level, or application level.

It is possible for relatively high-end devices to establish such an SA using IPSec provided:

a) They have existing certificates or a shared key and b) They are IP addressable and have already discovered each other's IPs. In many networks this won't apply.

A form of SA can also be established in a TLS session, provided at least one of the devices is addressable (the server) but there are similar requirements for certificates or pre-shared keys/passwords.

It is also possible for local area networks to establish a sub-IP SA either by manual assistance (loading of keys for WEP, WPA, Bluetooth PIN entry) or by unauthenticated Elliptic Curve Diffie Helman hoping there is no nearby Man In The Middle (Bluetooth v2.1 "Just Works" pairing).

There is no easy way to enforce authorization controls on such connections (e.g. a network-level policy about which devices can connect to which other devices, what protocols are supported, lifetime limits, whether the connection keys are escrowed etc.). Furthermore, there is no easy way to build IP-type SAs.

It is therefore an object of the invention to obviate or at least mitigate the aforementioned problems.

SUMMARY OF THE INVENTION

In accordance with a first aspect of the invention, there is provided a method for forming secure associations between IP-enabled devices, the method comprising:

establishing a first association between a first one of said devices and a first network server, receiving a declaration of ownership of a second one of said devices from a subscriber authentication storage means to the network, assigning a network realm identity to the second device, sending an authentication challenge to the subscriber authentication storage means;

receiving authentication information in response to the authentication challenge;

transferring the authentication information to the second device, facilitating a second association between the second device and a second network server in accordance with the transferred authentication information, establishing a secure connection between the first and second network servers, said secure connection having corresponding secure association information, and transferring said corresponding secure association information to both first and second devices using the first and second associations respectively, thereby providing the necessary association between the first and second IP-enabled devices.

Thus to enable formation of secure associations between IP-enabled devices when they have not previously connected, the method requires that a declaration of ownership of a target device is made by the subscriber of a originating device and that the subscriber giving that declaration is authenticated by means of a SIM card, say. The originating device establishes secure connection to a first server. The target device establishes a secure connection to a second server. Provided the first and second servers can establish a conventional IP-type SA (e.g. using IPSec or TLS), there is a chain of secure associations between the two devices. This chain is then used to build a new secure association between originating device and target Device. The first and second servers thus act as proxies for two devices respectively and negotiate the secure association on their behalf. They then transfer the new secure association information securely to the devices using the existing chain of secure associations.

Preferably, the step of assigning a network realm identity includes authenticating the second device using a manufacturer-provisioned identity.

In accordance with a further aspect of the invention, there is provided a system for forming secure associations between IP-enabled devices, the system comprising a first network server and a second network server the servers being operable to establish a secure IP-type association therebetween, said secure association having corresponding secure association information, wherein the first network server includes means for establishing a first association with a first one of said devices, means for receiving a declaration of ownership of a second one of said devices from a subscriber authentication storage means, means for assigning a network realm identity to the second device, means for sending an authentication challenge to the subscriber authentication storage means; means for receiving authentication information in response to the authentication challenge; and means for transferring the authentication information to the second device;

the second network server having means for establishing a second association with the second device in accordance with the transferred authentication information, wherein the first network server transfers said corresponding secure association information to the first device using the first association and the second network server transfers said corresponding secure association information to the second device using the second association, thereby providing the necessary association between the first and second IP-enabled devices.

BRIEF DESCRIPTION OF THE DRAWINGS

For a better understanding of the present invention, reference will now be made, by way of example only, to the accompanying drawings in which.

DETAILED DESCRIPTION

Figure 1:
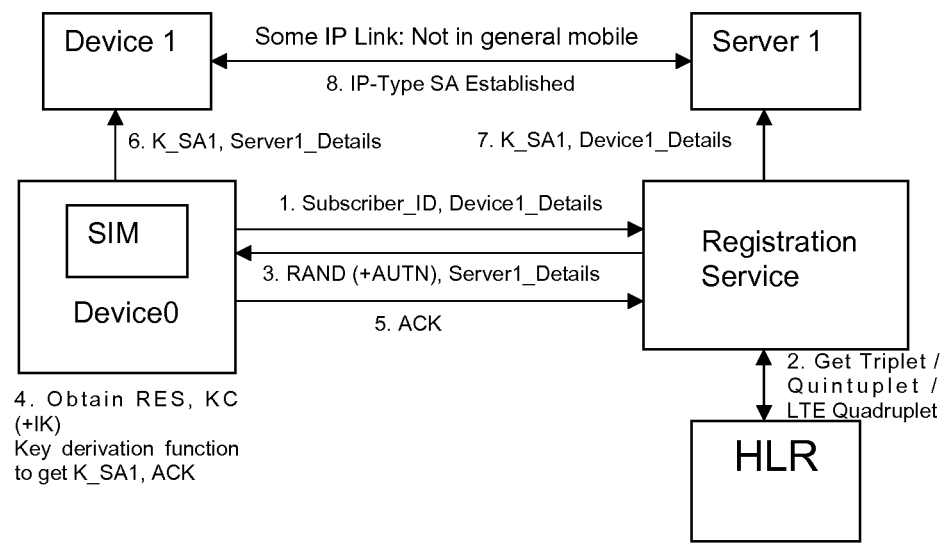
FIG. 1 illustrates the step of device registration in accordance with the invention.
Figure 2:
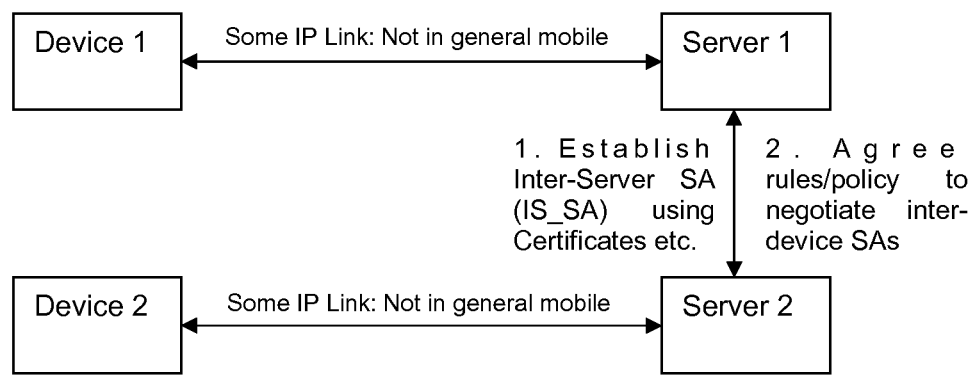
FIG. 2 illustrates the step of building an inter-server SA as a bridge in accordance with the invention.
Figure 3:
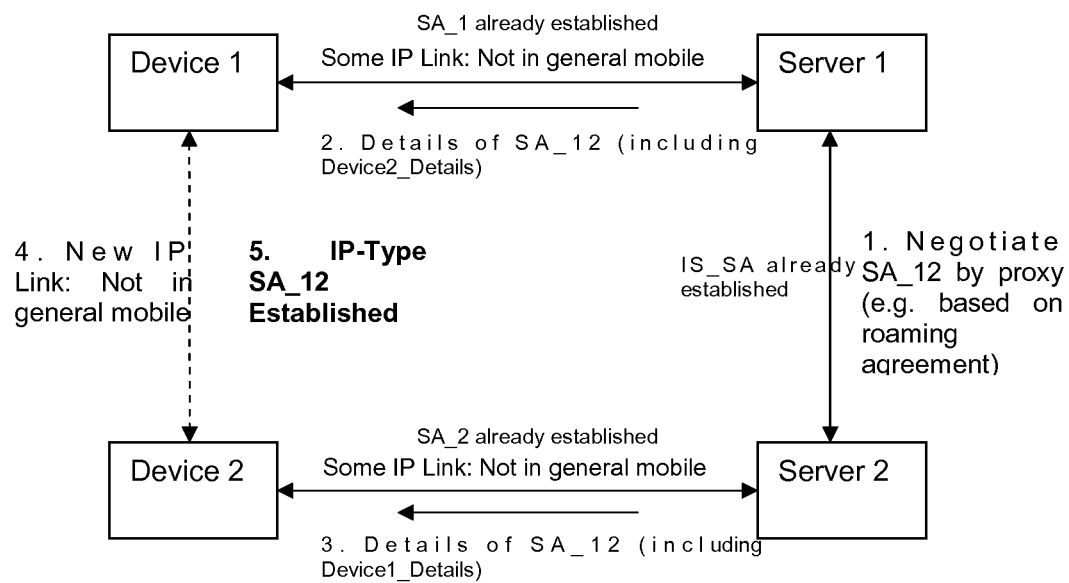
FIG. 3 illustrates the step of establishing an inter-device SA by proxy in accordance with the invention.

The first stage is to establish an IP-type SA between a Device and a network Server (which will then be used as a future negotiation and policy enforcement point). There is a registration protocol in which a Subscriber (known to a network using a (U)SIM) declares "ownership" of the target device to the network, and gives it a "friendly" identity within a network realm (e.g. devicename.subscribername@realm). This stage *may* involve authentication of the device using a manufacturer-provisioned identity (MAC address, Serial Number) or just declaration of that identity (if there is no pre-loaded key/certificate to authenticate). The protocol thereby provides some protection against devices being multiply-registered (by different owners), stolen, hacked, mis-configured etc. This stage *may* involve the choice of a pseudonym or pseudonym range to provide privacy protection for the Subscriber and/or device user.

The registration stage involves the network sending an authentication challenge to the (U)SIM, with some resulting key material (Kc or CK||IK or K_ASME) which is then transferred locally to the target device under the subscriber's control. The key(s) used for the SA are then derived from that key material, and there is a corresponding transfer of key material from the HLR and derivation at the network side. Various device-side methods include: temporary insertion of SIM card into device, connecting target device to a device which already holds the (U)SIM via USB, Infrared, NFC Bluetooth, WLAN, Zigbee etc. Various network-side methods include the Server presenting itself as an access node (like a base station) and obtaining an authentication vector. This works with protocols like UMA, IMS or various forms of heterogeneous access to 3GPP networks (WLAN interworking etc.) Or the GBA protocol could be used.

On completion of the first stage we have (say) Device1 connected to a Server1 using an IP-type SA. Similarly, we have Device2 connected to Server2 using an IP-type SA. We also now assume that Server1 and Server2 can establish a conventional IP-type SA (e.g. using IPSec or TLS) so we have three sides of a square in terms of existing SAs. This is then used to build the fourth side of the square: a new SA between Device1 and Device2. Broadly Server1 and Server2 act as "proxies" for Device1 and Device2 and negotiate the SA on their behalf. They then transfer the new SA information securely to the devices using the existing Device-Server SAs. One specific embodiment includes the Servers negotiating an IKE SA, and then transferring the associated keys and data to the devices, so they can establish one of more CHILD_SAs. Another specific embodiment involves the Servers also negotiating the CHILD_SA(s). A third embodiment involves the Servers "faking" the initial exchanges of IKE so that they end up with an agreed set of SA data but without going through the specific IKE ports or doing further Diffie-Helman exchanges. A fourth embodiment involves the Servers negotiating a new key which the Devices later use for pre-shared-key TLS. The general protocol also covers cases like Served=Server2, Device2=Server2 and Device2=Server3.

This staged approach has several advantages. 1. The end devices can be low end (they don't need to support Diffie Helman or an IKE stack, or present and verify certificates etc.). 2. The Servers can enforce policy rules so only allow a specific set of SAs to be established, certain protocols, lifetime limits etc. (The subscriber can contribute to the set of policy rules when registering the device). They can enforce Lawful Intercept or packet inspection by retaining keys; or (if the opposite is required) take themselves out of the encryption path. 3. The Servers could build a route between named devices, even when there is no direct addressability (because of NAT, firewalls etc.), and "tunnel" future SA-protected communications over this route. Or enable direct addressability once secured.

SAMPLE USE CASES

1. Salesman meets potential customer at a convention. Salesman has a home PC containing technical brochures, trial software etc. (Device1). Potential customer has a smartphone (Device2). Salesman wants to grant potential customer temporary access to his home network to retrieve the selected brochures, software etc. and collect some details about the customer. There are confidential details, so link needs to be secured end to end.

2. Employee has personal smartphone with SIM from Operator 1, and is assigned a company phone with SIM from Operator 2. Employee wishes to synch photos, calendar, contacts etc. between devices. They have incompatible memory cards. Employee could use Bluetooth, but it's ~1 GByte of data so would be very slow. Synching over 3G will be very expensive. Both phones support WLAN, but neither can act as access point, and the user doesn't want to fiddle around setting up a shared key anyway.

When negotiating an inter-device SA, the Servers detect that both devices are within range of an open WLAN hotspot. They are each prompted to connect to the hotspot, and can then share files (but encrypted and integrity protected so other hotspot users can't see the files, and neither can the hotspot operator).

The invention claimed is:

1. A method for forming secure associations between IP-enabled devices, the method comprising:

establishing, at a first network server, a first secure association between a first one of said devices and the first network server, receiving, at the first network server, from a subscriber known to a network using an authentication storage device, a declaration of ownership to the network of a second one of said devices, the first network server assigning a network realm identity to the second device, receiving, at the first network server, authentication information in response to authentication of the subscriber giving the declaration;

transferring the same authentication information from the first network server to the second device, the second network server establishing a second secure association between the second device and the second network server using the transferred authentication information, the first network server establishing a secure connection to the second network server using a third secure association, the first, second and third secure associations forming a chain of secure associations between the first device and the first network server, between the second device and the second network server, and between the first network server and the second network server, said secure connection having corresponding secure association information, the first and second network servers acting as proxies for the first and second devices, negotiating a fourth, different secure association on their behalf using the established chain of secure associations, the negotiated fourth secure association allowing the first device and the second device to communicate directly with each other in a secure manner as a result of the chain of secure associations, despite the first device having no prior communications with the second device and without the first and second devices exchanging keys or certificates, and the first network server transferring said corresponding secure association information to both first and second devices using the first and second associations respectively, thereby providing the necessary association between the first and second IP-enabled devices.

2. The method of claim 1, wherein declaration of ownership is received from the subscriber authentication storage device.

3. The method of claim 1, wherein receiving authentication information includes:

sending an authentication challenge to the subscriber authentication storage device; and receiving authentication information in response to the authentication challenge.

4. The method of claim 1, wherein the step of assigning a network realm identity includes authenticating the second device using a manufacturer-provisioned identity.

5. The method of claim 1, wherein the authentication storage device is a (U)SIM.

6. A system for forming secure associations between IP-enabled devices, the system comprising:

a first network server and a second network server, the first network server and the second network server being operable to establish a first secure IP-type association therebetween, said secure association having corresponding secure association information, wherein the first network server establishes a first association with a first one of said devices, receives, from a subscriber known to the network using an authentication storage device, a declaration of ownership of a second one of said devices, assigns a network realm identity to the second device, receives authentication information in response to authentication of the subscriber giving the declaration, and transfers the same authentication information to the second device; and the second network server establishing a second secure association with the second device in accordance with the transferred authentication information, wherein the first network server transfers said corresponding secure association information to the first device using the first association and the second network server transfers said corresponding secure association information to the second device using the second association, the first network server establishing a secure connection to the second network server using a third secure association, the first, second and third secure associations forming a chain of secure associations between the first device and the first network server, between the second device and the second network server, and between the first network server and the second network server, the first and second network servers acting as proxies for the first and second devices, negotiating a fourth, different secure association on their behalf using the established chain of secure associations, the negotiated fourth secure association allowing the first device and the second device to communicate directly with each other in a secure manner as a result of the chain of secure associations, despite the first device having no prior communications with the second device and without the first and second devices exchanging keys or certificates.

7. The system of claim 6, wherein declaration of ownership is received from a subscriber authentication storage device.

8. The system of claim 6, wherein receiving authentication information includes:

sending an authentication challenge to the subscriber authentication storage means; and receiving authentication information in response to the authentication challenge.

9. The system of claim 6, wherein the authentication storage device is a (U)SIM.

* * * * *